United States Patent [19]
Martin et al.

[11] Patent Number: 5,236,002
[45] Date of Patent: Aug. 17, 1993

[54] DOMESTIC WATER SUPPLY SHUTOFF VALVE

[75] Inventors: James M. Martin, East Greenwich; James W. Mears, Warwick, both of R.I.

[73] Assignee: Grinnell Corporation, Cranston, R.I.

[21] Appl. No.: 963,125

[22] Filed: Oct. 19, 1992

[51] Int. Cl.$^5$ .......................................... F16K 11/048
[52] U.S. Cl. .................................... 137/119; 137/117; 137/118; 137/508
[58] Field of Search ................. 137/117, 118, 119, 508

[56] References Cited

U.S. PATENT DOCUMENTS

| | | | |
|---|---|---|---|
| 90,483 | 5/1869 | Bartholomew | 137/119 |
| 2,203,138 | 6/1940 | Ginnaty | |
| 2,265,810 | 12/1941 | Lowe et al. | |
| 2,266,421 | 12/1941 | Griffith | |
| 3,559,670 | 2/1971 | Yedidiah | 137/119 X |
| 4,243,064 | 1/1981 | Nolte | 137/117 |
| 4,385,640 | 5/1983 | Iverson | 137/117 |
| 4,638,831 | 1/1987 | Lindgren | 137/117 |
| 4,798,221 | 1/1989 | Crawford et al. | 137/119 |

Primary Examiner—Stephen M. Hepperle
Attorney, Agent, or Firm—Fish & Richardson

[57] ABSTRACT

A domestic water supply shutoff valve for use with fire protection system water supply piping has a body defining a volume for flow of water through the valve, with a supply inlet for connection to a supply of water, a first outlet for connection to fire protection system water supply piping, and a second outlet for connection to domestic system supply piping. A first passageway is defined within the body for flow of water from the supply inlet toward the first outlet. A second passageway is defined within the body for flow of water from the supply inlet toward the second outlet. A poppet valve is disposed within the body and mounted for movement between a first position for permitting flow of water from the inlet toward the first outlet and a second position for permitting flow of water from the inlet toward the second outlet, the poppet valve being biased toward the second position.

14 Claims, 3 Drawing Sheets

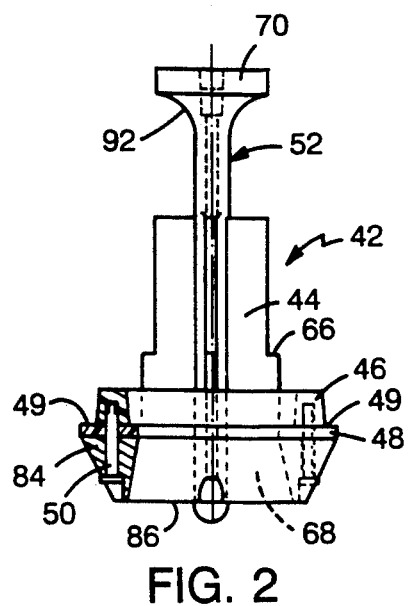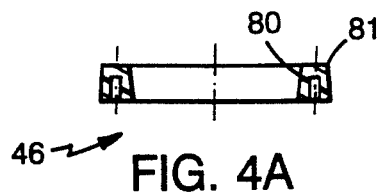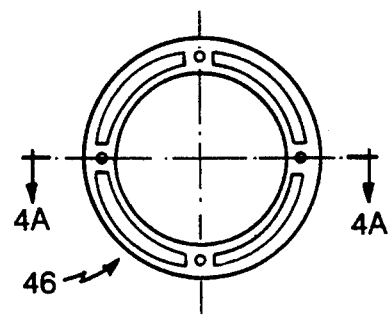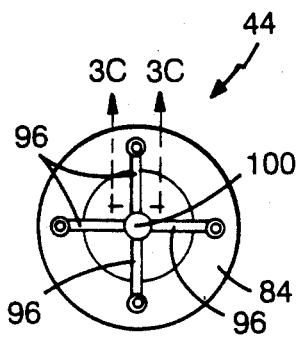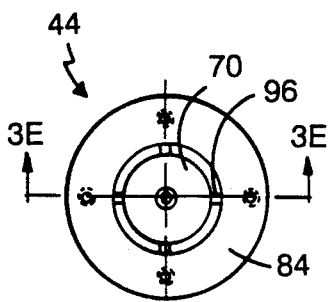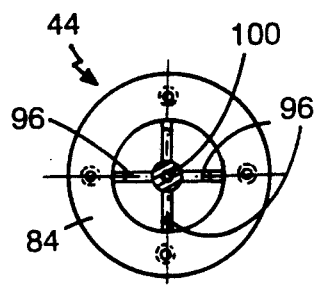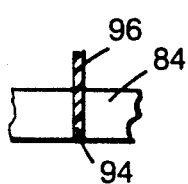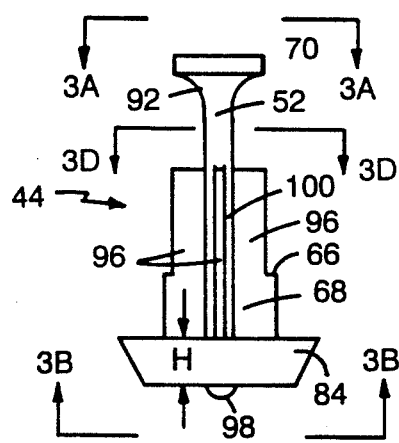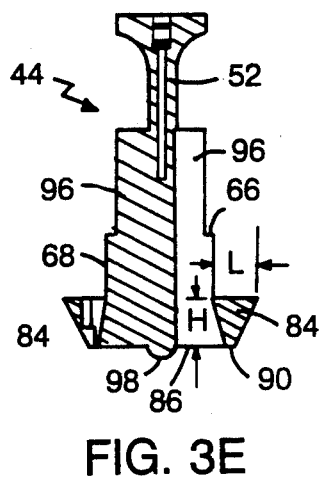

5,236,002

DOMESTIC WATER SUPPLY SHUTOFF VALVE

BACKGROUND OF THE INVENTION

The invention relates to a domestic water supply shutoff valve for use with a fire protection system.

Often, it is desired to install a fire protection system in a home or small business establishment. However, in many such instances, it is found that the supply pressure is not sufficient to meet both the maximum requirements of the domestic system and the minimum requirements of the fire protection system, in particular where the domestic requirements may be increased dramatically, e.g. by addition of a lawn watering system. Others, e.g. Lowe et al. U.S. Pat. No. 2,265,810, Griffith U.S. Pat. No. 2,266,421 and Ginnaty U.S. Pat. No. 2,203,138, have described supply line valves that, in the case of a fire, shut off flow to the domestic system, thus directing all of the supply pressure into the fire protection system.

SUMMARY OF THE INVENTION

According to one aspect of the invention, a domestic water supply shutoff valve for use in connection with fire protection system water supply piping comprises a body defining a volume for flow of water through the valve and having a supply inlet adapted for connection to a supply of water, a first fire outlet adapted for connection to fire protection system water supply piping, and a second domestic outlet adapted for connection to domestic system supply piping, a first fire passageway defined within the body for flow of water from a region of the supply inlet toward the first fire outlet, a second domestic passageway defined within the body for flow of water from a region of the supply inlet toward the second domestic outlet, and a poppet valve assembly comprising a poppet valve element disposed within the body and mounted for movement between a first position for permitting flow of water from the supply inlet toward the first fire outlet and a second position for permitting flow of water from the supply inlet toward the second domestic outlet, and means for biasing the poppet valve element toward the second position.

Preferred embodiments of this aspect of the invention may include one or more of the following features. The second domestic passageway defined within the body has an annular domestic inlet defined by the valve and the poppet valve assembly further comprises a differential ring of tapering cross section, sized and configured relative to the domestic inlet to cause flow of water through the domestic inlet to draw the differential ring into the domestic inlet. Preferably, the valve further comprises a domestic valve seat defined adjacent the domestic inlet, and the poppet valve assembly further comprises a domestic seal element defining a domestic seal surface disposed to engage sealingly upon the domestic valve seat when the poppet valve assembly is in the first position, with the differential ring extending within the domestic inlet. A surface of the domestic passageway is smoothly curved from a region adjacent the domestic inlet to a region of the domestic outlet. The valve comprises an annular laminar flow ring disposed at an upstream end of the poppet valve element, generally toward the supply inlet. Preferably, the poppet valve assembly comprises the annular laminar flow ring, the annular laminar flow ring being disposed at a first leading end of the poppet valve element. More preferably, the laminar flow ring has a toroidal shape with a tapering cross-section in the general shape of a scalene triangle, and it has a radius apex. The first fire passageway defined within the body has a fire flow orifice defined by the valve, the body defines a fire valve seat adjacent the fire flow orifice, and the valve further comprises a fire valve element and a fire seal element mounted upon the poppet element, the fire seal element defining a fire seal surface disposed to engage sealingly upon the fire valve seat when the poppet valve assembly is in the second position. Preferably, the poppet valve element has a tail portion in a region of the fire flow orifice, the tail portion defining a surface having concavo-conical shape configured to promote laminar flow about the fire valve element. The poppet valve element comprises an axial central shaft having a leading edge directed generally toward the supply inlet and an annular laminar flow ring attached coaxially about the central shaft by a plurality of radial fins. The leading edges of the fins directed generally toward the supply inlet are radiused to inhibit turbulent flow and reduce friction loss. Preferably, the leading edge of the central shaft has a hemispherical shape to inhibit turbulent flow and reduce friction loss.

Objectives of the invention include to provide a valve that allows installation of automatic fire protection systems in residences and the like having restricted water supplies in which the supply pressure is too low to provide sufficient water for both the maximum planned domestic use and the minimum required fire protection system use at the same time, and, to eliminate the risks of unanticipated increases in the maximum possible domestic use (such as by adding a lawn sprinkler system) and thereby further reducing the available water to be used for the fire protection system. The objectives of the invention also include to provide a valve that automatically shuts off the majority of water to the domestic supply piping and directs virtually all of the available supply to the fire protection system piping, whenever the fire protection system is activated.

A further objective of the invention is to provide a domestic water supply shutoff valve that operates independently of other mechanical or electrical devices.

A still further objective is to provide a valve that is self-resetting, i.e. will return automatically to a position directing virtually all of the flow to the domestic system after the fire protection system is reset following activation due to a fire or temporary flowing of water out of an inspection test connection.

Still further objectives of the invention include to provide a shutoff valve that acts as both a check valve and a diverter valve in that, under normal conditions of use, the main water supply is directed through the valve to the domestic piping while leakage of stagnant water from the automatic fire protection system into the domestic supply is inhibited. Upon actuation of one or more fire sprinkler heads, causing a drop in pressure in the fire protection system piping, the valve operates to seal off the majority of the flow to the domestic supply piping and directs virtually all of the main water supply to fire protection system use, thus keeping the required water supply pressure to a minimum.

A further objective of the invention is to provide a domestic supply shutoff valve of a construction that ensures a low friction (pressure) loss for water flowing through the valve, while keeping the relative size of the valve to a minimum, this friction loss being much less than the additional supply pressure necessary to supply both the minimum required fire protection system use and the maximum domestic system use at the same time.

These and other features and advantages of the invention will be seen from the following description of a presently preferred embodiment, and from the claims.

BRIEF DESCRIPTION OF THE DRAWING

FIG. 2 is a side view, partially in section, of the poppet assembly of the valve of FIGS. 1A and 1B;

FIGS. 3 and 3A are side and top views, respectively, of the poppet valve of FIG. 2;

FIG. 3B is a bottom view of the poppet taken at the line 3B—3B of FIG. 3;

FIG. 3C is a side section view of the poppet taken at the line 3C—3C of FIG. 3B;

FIG. 3D is a top section view of the poppet taken at the line 3D—3D of FIG. 3;

FIG. 3E is a side section view of the poppet taken at the line 3E—3E of FIG. 3A;

FIG. 4 is a plan view of the differential ring of the valve of FIGS. 1A and 1B; and FIG. 4A is a side section view of the differential ring taken at the line 4A—4A of FIG. 4.

DESCRIPTION OF THE PREFERRED EMBODIMENT(S)

Figure 1A:
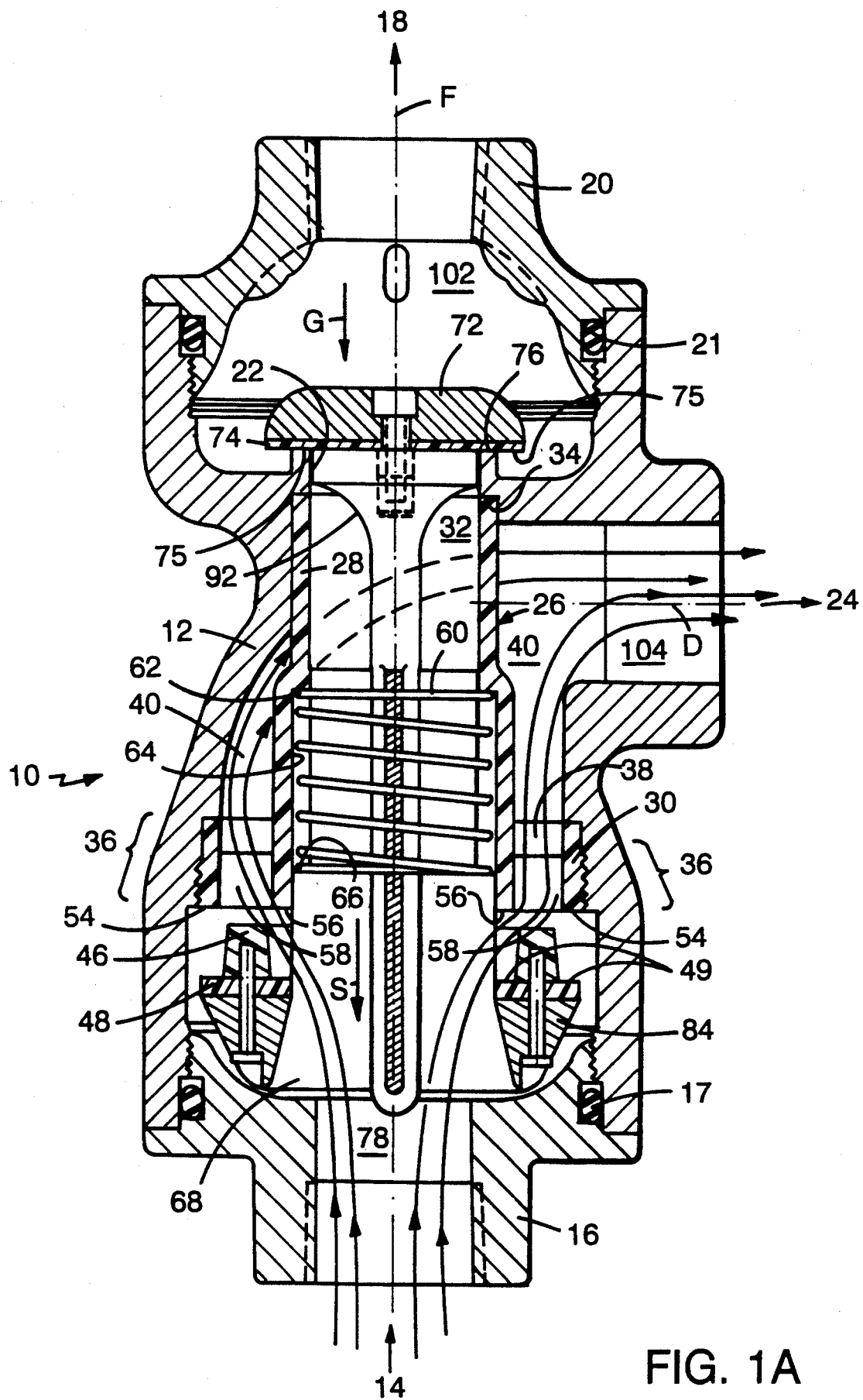
FIG. 1A is a side section view of a domestic water supply shutoff valve of the invention, with the poppet valve element positioned for flow of water to the domestic system, with flow to the fire protection system shut off.
Figure 1B:
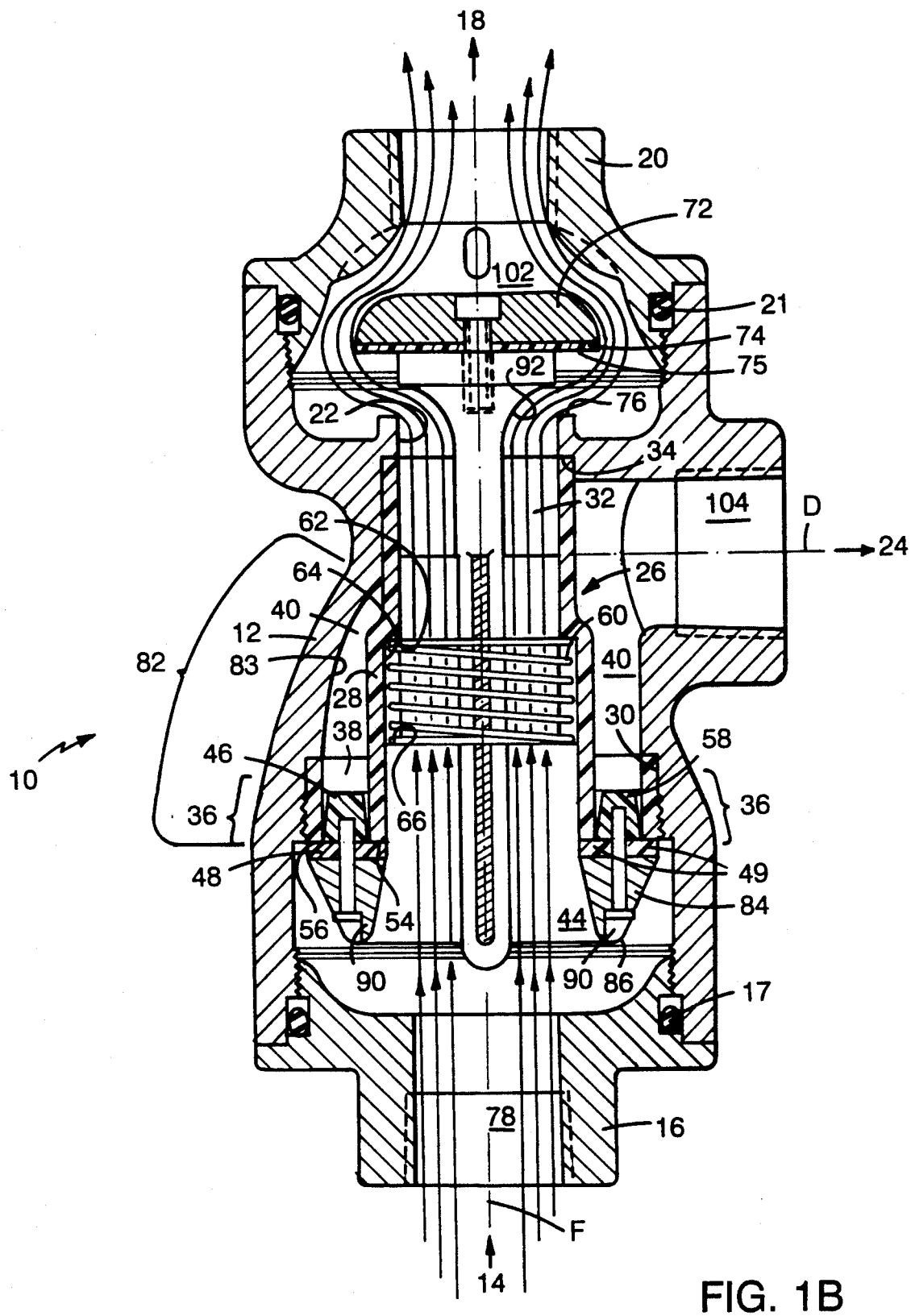
FIG. 1B is a similar view of the domestic water supply shutoff valve of FIG. 1A, with the poppet valve element positioned for flow of water to the fire protection system, with flow to the domestic system shut off.

Referring now to FIGS. 1A and 1B, a domestic water supply shutoff valve 10 of the invention has a body 12 having a center axis, F. The body 12 defines an inlet 14, which is threaded for receiving a coupling 16 joined to a main water supply piping, and a first outlet 18, which is coaxial with inlet 14 and similarly threaded for receiving a coupling 20 joined to fire protection system piping. The water-tight seals between the body 12 and couplings 16, 20 are secured by o-rings 17, 21, respectively. The body further defines a fire protection fluid flow orifice 22 lying between the inlet 14 and the first outlet 18, and coaxial therewith. Between the inlet 14 and orifice 22, on an axis, D, lying generally transverse to the axis, F, the body further defines a second outlet 24 connected to domestic system piping.

Mounted within the body 12, generally coaxial with the axis, F, is a flow conduit element 26 having a pair of coaxial sleeves 28, 30. The inner sleeve 28 defines a passageway 32 extending from the region of the inlet 14 to engagement with a shoulder 34 of the body 12 adjacent the flow orifice 22 to provide a conduit for flow of water from the inlet toward the fire protection system. The outer sleeve 30, which is disposed in threaded engagement with region 36 of the body, is connected to the inner sleeve 28 by spaced apart radial fin members 38, and the inner and outer sleeves define a passageway 40 therebetween to provide a conduit for flow of water from the inlet, about the inner sleeve 28, to the second outlet 24 toward the domestic system piping.

Referring also to FIG. 2 et seq., disposed within the body 12 is a poppet assembly 42 including a poppet element 44 (FIGS. 3—3E) with a differential ring 46 (FIGS. 4—4A) and a lower seal rubber washer 48 fixedly mounted thereupon by means of pan head screws 50. The poppet assembly is mounted for movement along the axis, F, with its tail portion 52 extending within the passageway 32 defined by the inner sleeve 28, and the lower seal rubber washer 48 having a seal surface 49 disposed for sealing engagement (FIG. 1B) upon the valve seat surfaces 54, 56 defined by sleeves 28, 30 about the inlet 58 to the domestic flow passageway 40. A spring member 60, disposed about the tail portion of the poppet and engaged between a shoulder 62 defined by the inner surface 64 of the inner sleeve 28 and a shoulder 66 defined by the head portion 68 (FIG. 3E) of the poppet, biases the poppet assembly toward the position of FIG. 1A and away from the position of FIG. 1B, as will be described more fully below. Fixedly mounted upon the tail end 70 (FIG. 2) of the poppet element 44 is a fire protection system valve element 72 and an upper seal rubber washer 74 defining a seal surface 75 is disposed for sealing engagement (FIG. 1A) upon the valve seat surface 76 defined by body 12 about fire protection fluid flow orifice 22.

Referring now to FIGS. 4 and 4A, the differential ring 46 is toroidal in shape, with a tapering cross sectional shape, preferably that of an isosceles trapezoid. The toroidal shape is chosen to conform to the annular inlet 58 of the domestic flow passageway 40 from the inlet chamber 78 (FIG. 1A). (A different volumetric shape could be selected for the differential ring, provided that the shape of the base of the differential ring conforms to the planar shape of the domestic inlet, as viewed from the inlet chamber. The tapering cross sectional shape of the isosceles trapezoid may also be varied to produce varying degrees of restriction within the inlet.) The preferred cross sectional shape of an isosceles trapezoid inhibits the propagation of turbulent flow past contours 80, 81 (FIG. 4A). As a result, the area of the flow path at the inlet 58 to the domestic water flow passageway 40 is reduced to some area smaller than that which is fed at the domestic outlet 24, thus to "choke-off" the flow and increase the pressure differential between the domestic supply outlet 24 and the fire protection system outlet 18. (Note that although turbulent flow would enhance the valve operation with respect to an increase in differential pressure, the turbulence would also increase the friction loss through the valve, which is an undesirable effect.) The differential ring 46 thus promotes automatic shutoff of flow to the domestic supply piping outlet 24 at low fire protection system flow conditions, due to restriction of the domestic waterway flow inlet clearance, to cause a difference in pressure between the domestic system outlet 24 and fire protection system outlet 18.

Referring again to FIG. 1B, the region 82 of the inner surface 83 of the body 12 defining the domestic flow passageway 40 leading to the domestic supply outlet 24 is smoothly curved. In the preferred embodiment, the curvature of the surface begins in the domestic system passageway 40 just above the inlet chamber 78, at the opposite side of the axis, F, from the domestic system outlet 24, and continues to the domestic system outlet, with the radial dimension of the surface being generally equivalent to the outside diameter of the domestic water system passageway. (This curved surface might also have the shape of an elbow, scoop, or the like.) The curved surface promotes laminar flow within the flow passageway 40 and, therefore, lowers friction loss while the direction of flow is changed by 90°.

Referring now to FIG. 3E, the poppet element 44 has a laminar flow ring 84 at its leading edge. The flow ring 84 is toroidal in shape, with a tapering cross-section in the general shape of an inverted scalene triangle and a radiused apex 90. The purpose of the flow ring is to promote laminar flow and to decrease the stagnation pressure effects of velocity head acting on the annular leading edge 86 of the poppet element, which tend to cause the poppet to move toward the operating position (FIG. 1B). The base of the inverted triangle shape receives lower seal rubber washer 48 which, over the plane, T (FIG. 2), provides the sealing surface 49 which closes off the domestic system water passageway 40 during operation of the valve 10. The preferred cross-sectional shape of the flow ring 84 is triangular, with a height, H, from base to apex which is equivalent to the radial length, L, of the sealing surface 49. (A shorter height, H, and more acute angles, will result in a greater effect of velocity head across the flow ring 84. A greater height, H, will serve to lessen the effects of velocity head.) The preferred shape of a scalene triangle produces the effects of a greater triangular height by having a less acute angle toward the supply inlet 14, thereby reducing velocity head effects. The radiused apex 90 could also be made sharp but should not be blunt, so as not to create turbulent flow through the fire protection flow passageway 32 during operation.

Referring also to FIG. 3, the surface 92 of the trailing end portion 52 of the poppet element 44 has a concavo-conical shape to promote laminar flow around the fire protection system valve element 72 (FIG. 1A) when water passes through the passageway 32 toward the fire protection system outlet 18. The non-turbulent flow is important in order that friction losses through the valve may be kept to a minimum.

Referring also to FIGS. 3, 3B and 3C, the leading edges 94 of the poppet waterway guides 96 have a radiused shape, and the leading edge 98 of the poppet center shaft 100 has a hemispherical shape, both in order to inhibit turbulent flow and reduce friction loss effects of water velocity passing about the head portion 68 of the poppet element.

When the domestic water supply shutoff valve 10 of the invention is put into service, and the systems are pressurized with water, pressure becomes equalized on both the domestic system side (outlet 24) and fire protection system side (outlet 18) of the valve. Both gravitational forces (arrow G) and a spring force (arrow S) are used to normally hold the poppet assembly 42 down (FIG. 1A) so that the upper seal 74 is seated on the valve seat 76 thereby sealing the fire protection fluid flow orifice 22 leading to the fire protection system outlet chamber 102. The normally seated poppet assembly 42 acts like a check valve seal to inhibit leakage of stagnant water across the orifice 22 from the fire protection system piping into the domestic system supply. If supply pressure at inlet 14 is increased due, e.g., to a pressure surge, the poppet element 44 moves up slightly to allow the upper seal 74 to lift from the valve seat 76, allowing water to flow through the orifice 22 and equalize the pressure within the valve body 12, and to the fire protection sprinkler piping at outlet 18. Once equalized, the poppet element 44 resets itself and the valve 10 is again in position to allocate the full water supply to domestic uses via outlet 24. While water is flowing to domestic uses, some loss of pressure will occur through the valve from the supply inlet 14 to the domestic system piping. However, the higher pressure in the fire protection system piping, due to surges, will be maintained and, in fact, will cause the upper seal 72 to be held in place with greater force due to the pressure differential across the orifice 22.

If, while water is flowing to domestic uses via outlet 24, one or more fire sprinkler heads are operated due to a fire, the sprinkler system piping will rapidly lose pressure. With the momentary loss in the fire protection system pressure, the greater pressure within the valve body 12, i.e. in the passageway 32 on the inlet side of upper seal 72, causes the poppet element 44 to move upward, against gravity, G, and the spring force, S, to allow flow of water through the orifice 22 to the fire protection system via outlet 18.

As the poppet element 44 is moved upward to allow flow through the passageway 32, the tapering differential ring 46 is drawn into the annular inlet 58 to the domestic system passageway 40. The greater pressure differential created across the lower portion of the poppet and the domestic system passageway causes the lower seal 48 to shut tightly against the lower seat surfaces 54, 56 of the inner and outer sleeves 28, 30. Empirical data shows that for the preferred configuration of the 1-inch size domestic water supply shutoff valve 10, the minimum total flow through the valve (combination of flow to domestic system use and to fire protection system use) to produce a shutoff of the domestic flow, is usually between 12 and 18 GPM. The variation in the operating flow is dependent upon stagnation pressure, due primarily to the velocity of the water passing the laminar flow ring 84 of the poppet element 44, so that at greater domestic flows, where velocity is greater, the minimum combined flow to produce shutoff is less than would be required given smaller domestic flows. That is, for a 10 GPM (gallons per minute) domestic flow condition, a flow of about 2 GPM must be established through the fire protection system outlet 18 (total flow of 12 GPM) to cause the shutoff of flow to the domestic system outlet 24, and at a 2 GPM flow rate through the domestic system outlet 24, a flow rate through the fire protection system outlet 18 in the range of 13 to 16 GPM must be established before shutoff of the domestic flow will occur.

When domestic flow shutoff occurs, pressure on the domestic system side of the valve drops to essentially zero and the poppet element 44 is held up in place (FIG. 1B) with the fire protection system passageway 32 open to flow until the pressure within the valve is equalized. The valve 10 will automatically re-set itself when the pressure within the valve body 12 is equalized by shutting off the water supply from the inlet 14 and allowing the pressure to drop to zero on the fire protection system side (outlet chamber 102) of the valve.

For the preferred configuration of the 1-inch size valve, shutoff of the domestic supply side of the valve, i.e sealing engagement of lower seal 48 upon valve seat surfaces 54, 56, cannot occur at total flows less than the range stated above because the minimal distance that the poppet element 44 moves up, in order to allow passage of sufficient flow of water through orifice 22 to the fire protection system, is not enough to draw the differential ring 46 far enough into the annular inlet 58 to the domestic water flow passageway 40 to create sufficient pressure differential to result in "choking off" of the domestic system supply.

Under normal circumstances, a single operating fire sprinkler head will result in a flow through orifice 22 to the fire protection system side of the valve greater than the minimum required to cause shutoff of the flow to the domestic system.

If a fire sprinkler head is operated while no water is being used in the domestic system, the pressure on the domestic system side (chamber 104) will be equal to or greater than that on the fire protection system side (chamber 102) and the poppet assembly 42 will not completely shut off the domestic flow. This circumstance does not inhibit flow to the fire protection system side of the valve, since the poppet element 44 will be moved into the full open position (FIG. 1B). However, if domestic system flow is initiated while there is flow to the fire protection system, flow to the domestic system will be immediately shut off by the poppet valve, and the valve will require equalization by shutting off of the water supply, to allow self-resetting to occur.

The effects of water velocity past the head portion 68 of the poppet element 44 can cause the valve to operate to shut off domestic flow, even in the absence of fire protection system flow. Empirical data shows this will not occur up to a flow rate of 120 GPM through the domestic system inlet 14 of the 1-inch size domestic water supply shutoff valve 10 for the preferred configuration, which is well above the range of normal usage.

An important feature in the development of the domestic water supply shutoff valve of the invention is that it ensures a low friction (pressure) loss for water flowing through the valve, while keeping the relative size of the valve to a minimum. This friction loss is much less than the additional supply pressure which would be necessary to supply both the minimum required fire protection system use and the maximum domestic system use, at the same time.

Empirical data has shown that typical friction losses for the preferred configuration of a 1-inch size domestic water supply shutoff valve of the invention are approximately the same for flow through the domestic system side of the valve as through the fire protection system side of the valve, for flow rates up to about 30 GPM. These losses have been determined to be negligible for flows up to about 5 GPM, and the friction loss is about 2 psi (pounds per square inch) at a flow of about 30 GPM. Flows of about 40 GPM produce losses of about 3.1 psi and 3.4 psi on the domestic system side and on the fire protection system side, respectively, and flows of 50 GPM produce losses of about 4.4 and 5.1 psi, respectively. Friction losses through the valve are dependent on the cross-sectional area through which the flow occurs, on the design and shapes of the various components within the valve as well as on the design of the flow paths through the valve.

As an example, the friction losses through a 1-inch size domestic water supply shutoff valve 10 of the invention was compared to the additional supply pressure needed to feed both a fire protection sprinkler system and an average domestic supply in the absence of the valve. Considering a maximum domestic flow of 20 GPM through the equivalent of 100 feet of type M, $\frac{3}{4}$-inch size copper tubing, the additional pressure required to support this domestic demand (in addition to the minimum supply pressure calculated for fire protection system demand) is 30 psi. However, when using a 1-inch size domestic supply shutoff valve of the invention, only a 2 psi increase in pressure (the friction loss at the maximum calculated flow rate), above that necessary to supply the fire protection system, is required.

The domestic water supply shutoff valve 10 of the invention thus allows the installation of automatic fire protection systems in residences having restricted water supplies, i.e. those where the supply pressure is too low to provide sufficient water for both the maximum planned domestic use and the minimum required fire protection system use at the same time. It also eliminates the risk of unanticipated increases in the maximum possible domestic use which would further reduce the available water to be used for the fire protection system. The domestic water supply shutoff valve of the invention achieves this purpose by automatically shutting off the majority of water to the domestic supply piping and directing virtually all of the available supply to the fire protection system piping whenever the fire protection system is activated. The domestic water supply shutoff valve operates independently of other mechanical or electrical devices, and it is self-resetting after the fire protection system is reset following activation. The valve acts as both a check valve and a diverter valve in that, under normal conditions of use, the main water supply is directed through the valve to the domestic piping while inhibiting leakage of stagnant water from the automatic fire protection system into the domestic supply and, upon actuation of one or more fire sprinkler heads, causing a drop in pressure in the fire protection system piping, the valve operates to seal off the majority of the flow to the domestic supply piping and directs virtually all of the main water supply to fire protection system use, thus keeping the required water supply pressure to a minimum.

Other embodiments are within the following claims. For example, while the above description of the invention, by way of example only, is directed to a 1-inch size domestic water supply shutoff valve, it should be understood that the valve may be made in smaller or larger sizes, and, furthermore, it may be used in applications other than one- or two-family dwellings and mobile homes. For example, a domestic water supply shutoff valve of the invention may also be used in multi-family dwellings, or commercial or industrial installations where, in the event of a fire, the shutoff valve of the invention may be used to divert essentially all of the water needed in the day-to-day operation of the business to the fire protection system.

Also, the range of total flow required to cause shutoff may be raised or lowered by changing one or more of the described features for controlling operating parameters. For example, the configuration of the differential ring may be changed to choke off domestic system flow through inlet 58 upon smaller or greater movement of the poppet element. The configurations of the curvature of region 82 of surface 83 in the domestic water flow passageway 40, the laminar flow ring 84 and/or the leading edges 94, 98 of the poppet waterway guides 96 or center shaft 100 may be changed to allow greater or lesser effects from water velocity passing over these features. Also, the configuration of the surface 92 of the poppet tail portion 70 may be changed to allow greater friction loss through the domestic system side of the valve.

The valve may be used to restrict domestic flow to various degrees, rather than shutting off flow completely.

Also, the annular laminar flow ring may be fixedly mounted adjacent an upstream end of the poppet valve element, generally toward the supply inlet, rather than forming a part of the poppet valve element as described above.

What is claimed is:

1. A domestic water supply shutoff valve for use in connection with fire protection system water supply piping comprising
 a body defining a volume for flow of water through said valve and having a supply inlet adapted for connection to a supply of water, a first fire outlet adapted for connection to fire protection system water supply piping, and a second domestic outlet adapted for connection to domestic system supply piping,
 a first fire passageway defined within said body for flow of water from a region of said supply inlet toward said first fire outlet,
 a second domestic passageway defined within said body for flow of water from a region of said supply inlet toward said second domestic outlet, said second domestic passageway having an annular domestic inlet defined by said body, and
 a poppet valve assembly comprising a poppet valve element disposed within said body and mounted for movement between a first position for permitting flow of water from said supply inlet toward said first fire outlet and a second position for permitting flow of water from said supply inlet toward said second domestic outlet, a differential ring of tapering cross section mounted on said poppet valve element, said differential ring being sized and configured relative to said domestic inlet to increase the pressure differential between said second domestic outlet and said first fire outlet and draw said differential ring into said domestic inlet, and means for biasing said poppet valve element towards said second position.

2. The domestic water supply shutoff valve of claim 1 wherein a surface of said domestic passageway is smoothly curved from a region adjacent said domestic inlet to a region of said domestic outlet.

3. The domestic water supply shutoff valve of claim 1 wherein said valve comprises an annular laminar flow ring disposed at an upstream end of said poppet valve element, generally toward said supply inlet.

4. The domestic water supply shutoff valve of claim 3 wherein said poppet valve assembly comprises said annular laminar flow ring, said annular laminar flow ring being disposed at a first leading end of said poppet valve element.

5. The domestic water supply shutoff valve of claim 1 wherein said first fire passageway defined within said body has a fire flow orifice defined by said valve, said body defines a fire valve seat adjacent said fire flow orifice, and said valve further comprises a fire valve element and a fire seal element mounted upon said poppet element, said fire seal element defining a fire seal surface disposed to engage sealingly upon said fire valve seat when said poppet valve assembly is in said second position.

6. The domestic water supply shutoff valve of claim 5 wherein said poppet valve element has a tail portion in a region of said fire flow orifice, said tail portion defining a surface having concavo-conical shape configured to promote laminar flow about said fire valve element.

7. The domestic water supply shutoff valve of claim 1 wherein said differential ring is shaped to increase said pressure differential without substantially increasing the turbulence of the flow into said domestic inlet.

8. A domestic water supply shutoff valve for use in connection with fire protection system water supply piping comprising
 a body defining a volume for flow of water through said valve and having a supply inlet adapted for connection to a supply of water, a first fire outlet adapted for connection to fire protection system water supply piping, and a second domestic outlet adapted for connection to domestic system supply piping,
 a first fire passageway defined within said body for flow of water from a region of said supply inlet toward said first fire outlet,
 a second domestic passageway defined within said body for flow of water from a region of said supply inlet toward said second domestic outlet, said second domestic passageway having an annular domestic inlet defined by said body and a domestic valve seat defined adjacent said domestic inlet, and
 said poppet valve assembly comprising a poppet valve element disposed within said body and mounted for movement between a first position for permitting flow of water from said supply inlet toward said first fire outlet and a second position for permitting flow of water from said supply inlet toward said second domestic outlet, a differential ring of tapering cross section mounted on said poppet valve element, said differential ring being sized and configured relative to said domestic inlet to draw said differential ring into said domestic inlet, a domestic seal element defining a domestic seal surface disposed to engage sealingly upon said domestic valve seat when said poppet valve assembly is in said first position, with said differential ring extending within said domestic inlet, and means for biasing said poppet valve element towards said second position.

9. A domestic water supply shutoff valve for use in connection with fire protection system water supply piping comprising
 a body defining a volume for flow of water through said valve and having a supply inlet adapted for connection to a supply of water, a first fire outlet adapted for connection to fire protection system water supply piping, and a second domestic outlet adapted for connection to domestic system supply piping,
 a first fire passageway defined within said body for flow of water from a region of said supply inlet toward said first fire outlet,
 a second domestic passageway defined within said body for flow of water from a region of said supply inlet toward said second domestic outlet, and
 a poppet valve assembly comprising a poppet valve element disposed within said body and mounted for movement between a first position for permitting flow of water from said supply inlet toward said first fire outlet and a second position for permitting flow of water from said supply inlet toward said second domestic outlet, and an annular laminar flow ring, having a toroidal shape with a tapering cross section in the general shape of a scalene triangle, disposed at an upstream end of said poppet valve element, generally toward said supply inlet.

10. The domestic water supply shutoff valve of claim 9 wherein said laminar flow ring has a radius apex.

11. The domestic water supply shutoff valve of claim 9 wherein said laminar flow ring is disposed at a first leading end of said poppet valve element.

12. A domestic water supply shutoff valve for use in connection with fire protection system water supply piping comprising

- a body defining a volume for flow of water through said valve and having a supply inlet adapted for connection to a supply of water, a first fire outlet adapted for connection to fire protection system water supply piping, and a second domestic outlet adapted for connection to domestic system supply piping,
- a first fire passageway defined within said body for flow of water from a region of said supply inlet toward said first fire outlet,
- a second domestic passageway defined within said body for flow of water from a region of said supply inlet toward said second domestic outlet, and
- a poppet valve assembly comprising a poppet valve element disposed within said body and mounted for movement between a first position for permitting flow of water from said supply inlet toward said first fire outlet and a second position for permitting flow of water from said supply inlet toward said second domestic outlet, said poppet valve element comprising an axial central shaft having a leading edge directed generally toward said supply inlet and an annular laminar flow ring attached coaxially about said central shaft by a plurality of radial fins.

13. The domestic water supply shutoff valve of claim 12 wherein leading edges of said fins directed generally toward said supply inlet are radiused to inhibit turbulent flow and reduce friction loss.

14. The domestic water supply shutoff valve of claim 12 or 13 wherein said leading edge of said central shaft has a hemispherical shape to inhibit turbulent flow and reduce friction loss.

* * * * *